June 20, 1961      A. G. HERON      2,988,899
REFRIGERANT EVAPORATOR WITH DEFROSTING MEANS
Filed April 1, 1958
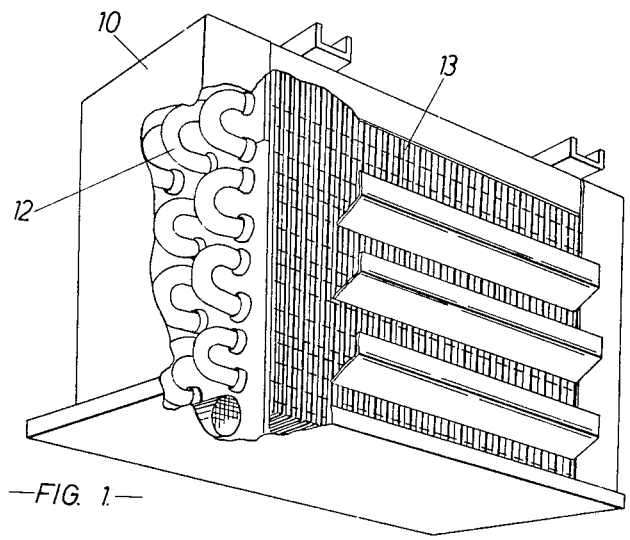
—FIG. 1.—
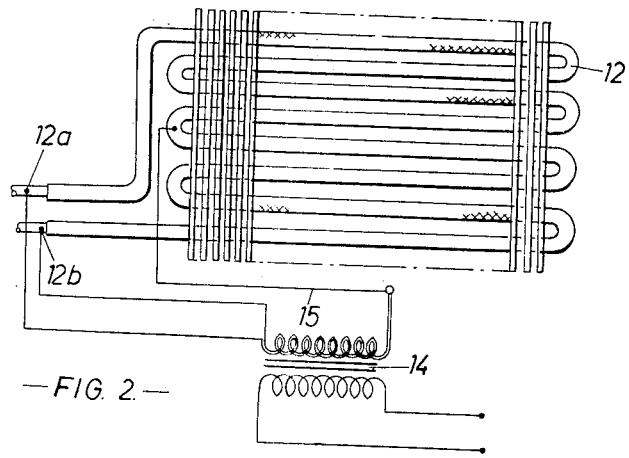
—FIG. 2.—
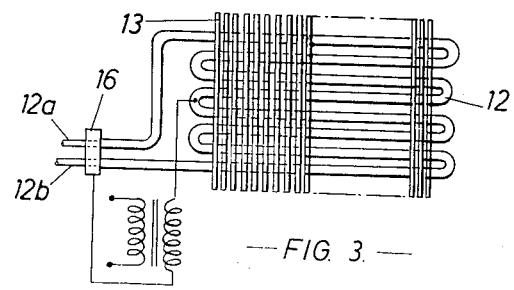
—FIG. 3.—
INVENTOR
Andrew George Heron
BY
Johnson and Kline
ATTORNEYS

United States Patent Office 2,988,899
Patented June 20, 1961

2,988,899
REFRIGERANT EVAPORATOR WITH DEFROSTING MEANS

Andrew George Heron, 20 The Grove, Benton, Newcastle-upon-Tyne, England
Filed Apr. 1, 1958, Ser. No. 725,738
Claims priority, application Great Britain Apr. 2, 1957
12 Claims. (Cl. 62—276)

The present invention relates to refrigerating apparatus and is concerned with means for defrosting evaporators of refrigerators more particularly of the forced air type.

In evaporators of the kind comprising simply a sinuous tube it is already known to effect defrosting (i.e. removal of ice from the tube) by passing an electric current through the tube from a low voltage source such as the secondary side of a step down transformer. The flow of current raises the temperature of the tube sufficiently to melt or dislodge the frost.

The expression "sinuous tube" where used in this specification means a bank of laterally spaced lengths of tube connected together at their opposite ends in series and includes a length of tube bent to this form or a series of separate lengths connected together at their ends by connecting pieces.

Evaporators with which the present invention is concerned comprise, in addition to a sinuous tube, a series of metal fins which are carried by and extend across the lengths of said tube so as to promote heat dissipation. This introduces a problem where it is desired to effect defrosting, as just described, by passing an electric current through the tube because the metal fins will, unless some precaution is taken to prevent it, short circuit the current conducting path. It is not possible simply to insulate the fins from the tube by known means because this will interfere materially with the conduction of heat from the tube to the fins, known electrical insulating materials also being good thermal insulants, and the fins will not fulfill the purpose for which they are intended.

The present invention overcomes this problem by utilising a low voltage i.e. a voltage not higher than 25 volts, and preferably between 0.5 volt and 5 volts, with a high current flow in conjunction with an insulating film between the juncture of the evaporator tube and each fin which film comprises a hard flexible film of a synthetic resin of a thickness not greater than 0.01 of an inch, e.g. a thickness of the order of 0.003 of an inch. An insulating film of this character is adequate to insulate the fins electrically from the tube provided the voltage of the heating current is below the limit above specified whilst at the same time the surprising fact has been discovered that the film does not interfere materially if at all, with the conduction of heat from the tube to the fins.

Preferably the flexible insulating film is of a synthetic resin which is thermosetting and free of plasticiser. If the artificial resin contains a plasticiser such plasticiser is adversely affected by the continually changing temperatures to which the evaporator is subjected with the result that after a relatively short time the insulating properties of the film tend to break down.

The current passing through the tube during the defrosting period may be 200 amps. or more and for example may be as high as 800 amps. for a short period.

It is important to prevent the flow of the electric heating current in the external refrigerating circuit. This may be effected in a simple manner (i.e. without specially insulating the evaporator and the rest of the refrigerating apparatus although this may be done if desired) by supplying the heating current from a low voltage transformer having a secondary winding wound with twin insulated wire. The twin wires are electrically connected together at one end of the winding and said joined ends connected to the evaporator pipe intermediate its ends, the other ends of said wires being connected respectively to the ends of the evaporator pipe. Alternatively the two ends of the evaporator pipe may be electrically connected together and connected also to one side of the electricity supply, a point intermediate the ends of the pipe being connected to the other side of said supply. In this case also, of course, the supply may be the secondary winding of a transformer.

The invention will be further described by way of example with reference to the accompanying drawings whereon:

FIGURE 1 is a perspective view, partly broken away of a forced air evaporator for a refrigeration system;

FIGURE 2 shows one arrangement according to the invention for supplying heating current to the evaporator coils to effect defrosting, and FIGURE 3 shows an alternative arrangement for supplying electricity to the coils for defrosting purposes.

Referring first to FIGURE 1 of the drawings the evaporator comprises a casing 10 having a louvred front and housing the sinuous metal tubes 12 and a multiplicity of closely spaced cooling fins 13, in the form of rectangular metal plates, through which the lengths of the sinuous tube 12 pass. The fins 13 are connected to the evaporator tube 12 so as to provide good thermal conductivity from one to the other.

The evaporator tube 12 is adapted to be defrosted periodically by passing a low voltage electric current through the metal walls of the tube the resistance and dimensions of which are such as to cause the temperature of the pipe to be raised sufficiently to effect the desired defrosting.

In the arrangement shown in FIGURE 2 the heating current is supplied by a step down transformer 14 having a high current out-put at low voltage. The transformer 14 has a parallel wound secondary winding i.e. said winding is wound with twin insulated wire. The two ends of the said winding are connected together at one end and said joined ends are connected by a lead 15 to the evaporator coil as shown on the drawing. The twin wires at the other end of the secondary winding are connected respectively to the two ends of the evaporator tube as indicated at 12a and 12b. The connection of the lead 15 to the evaporator tube is generally mid-way between the ends of the tube in which case uniform heating of the evaporator tube will be achieved during defrosting. Where however it is required that one portion of the evaporator tube should be raised to a somewhat higher temperature than the other the lead 15 could be connected to the evaporator tube at a point nearer one of the ends of the tube than the other.

In the arrangement shown in FIGURE 3 the two ends of the evaporator tube 12a and 12b are electrically connected together by a metal strap 16 to which one end of the secondary winding of a step down transformer is connected.

The other end of said secondary winding is connected to the evaporator tube at a point say mid-way between the ends of the latter, if uniform heating is desired, or somewhat nearer one end than the oher, as previously described, if it is desired to raise the temperature of one portion of the evaporator tube more than another to effect proper defrosting.

In both of these arrangements the supply of electric heating current to the evaporator tube is such that there will be no material flow of current to the associated refrigerant circuit or apparatus even although the evaporator tube is not electrically insulated from said circuit.

As stated above the fins 13 extend across and are connected to the numerous lengths of the sinuous evaporator tube and in accordance with the present invention these lengths of the tube are coated or covered with a film or sheath of electrically insulated material. This prevents the fins electrically short circuiting any of the convolutions of the evaporator tube and impairing defrosting.

Preferably the film of electrically insulating material is a hard flexible film of a synthetic resin of a thickness of the order of 0.003 of an inch. The type of resin employed is preferably that which is thermosetting and free of plasticiser. If a resin incorporating a plasticiser is employed the alternating temperatures to which it is subjected may render the plasticiser ineffective after a relatively short period with the result that the resin tends to craze and then to peel off the tube with the danger that the insulating film between the tube and the fins disappears. As an example of a suitable resin epoxylene may be used to provide a dielectric film of a minimum thickness without impairing heat transference between the fins and the tube. Specifically it has been found that a resin of this type which are condensation products of poly-arylethylene oxide compounds with acid anhydrides, amines, and other compounds and sold under the trademark "Araldite" No. 985E has proved to be highly suitable for this purpose.

Conveniently the resin is applied as a film by means of dipping or spraying and in the case of Araldite may be formed into a spraying or dipping solution by dissolving in acetone or a ketone. Conveniently the film which may be of the order of 0.003 of an inch thick can be built up by forming two or more coatings. The resulting film is hard and flexible and thus expands and contracts readily with the tube as the temperature varies. It is sufficiently hard to provide a good support for the fins and furthermore the co-efficient of expansion of this resin is sufficiently comparable to that of the metal of the evaporator tube, which normally is copper, as to prevent cracking or wrinkling normally occasioned by a differential.

It has also been found that whereas it is normal to tin the copper tubing of the evaporator in order to protect the copper from erosion or corrosion this is rendered unnecessary by the coating of epoxylene resin or other dielectric.

A further advantage of employing a protective film of a resin is that the ice formed upon the tube leaves the tube more freely than when the ice forms on a metal surface.

As further examples of suitable synthetic resins, synthetic rubbers (e.g. the material known under the registered trademark Neoprene) and silicones may be cited. It is important that the insulated film should have toughness and good thermal conductivity.

Although the evaporator tube is normally made of copper it may be possible and desirable for the purpose of this invention to make it of a material having a higher specific resistance than copper. This would have the advantage of reducing the current necessary to produce the required heat bearing in mind that the voltage will in most cases be between 0.5 and 5 volts.

A further feature of the present invention lies in the provision of means for cutting off the defrosting current to the evaporator should the temperature rise unduly and the other automatic controls, normally consisting of a time switch and/or a pressure switch in the refrigerant circuit, fail. According to this feature a thermostat is mounted inside the transformer and is adjusted so that it operates a cut-out switch in the main circuit at a predetermined temperature for example 120° F. In the type of transformer from which a low voltage and a high amperage is available the temperature gradient is steep and by providing a cut-out switch controlled by a thermostat within the transformer cut-out is ensured very shortly after an undesirable temperature is reached. The temperature rise in the transformer will be directly proportional to the time the current is passing and therefore proportional to the temperature of the evaporator. Generally half an hour to forty-five minutes is adequate for normal defrosting. The thermostat in the transformer will, therefore, be adjusted to cut off the current should the transformer ever be energised for longer than this period, e.g. for longer than forty-five minutes.

Two or more lengths of the evaporator tube may be electrically connected in parallel to give different temperatures in different parts of the evaporator. Alternatively, the evaporator tube may be made of thicker section in some parts to provide different temperatures at different parts of the evaporator or the tube may be made of different metals to vary the resistance.

What I claim is:

1. An evaporator comprising a sinuous tube and metal cooling fins extending across the lengths of said tube for heat dissipation, the sinuous tube being connected to a source of electricity not exceeding 25 volts so that the flow of current through the tube will raise the temperature of the tube to effect defrosting thereof, wherein the tube is electrically but not thermally insulated from the fins, so as to prevent short circuiting of the sinuous conducting path provided by the tube, by an insulating film between the juncture of the evaporator tube and each fin which film comprises a hard flexible film of a synthetic resin of a thickness of the order of 0.003 of an inch and not exceeding 0.01 of an inch.

2. An evaporator comprising a sinuous tube and metal cooling fins extending across the lengths of said tube for heat dissipation, the sinuous tube being connected to a source of electricity having a voltage of the order of 0.5 to 5 volts so that the flow of current through the tube will raise the temperature of the tube to effect defrosting thereof, wherein the tube is electrically but not thermally insulated from the fins, so as to prevent short circuiting of the sinuous conducting path provided by the tube, by an insulating film between the juncture of the evaporator tube and each fin which film comprises a hard flexible film of a synthetic resin of a thickness of the order of 0.003 of an inch and not exceeding 0.01 of an inch.

3. An evaporator comprising a sinuous tube and metal cooling fins extending across the lengths of said tube for heat dissipation, the sinuous tube being connected to a source of electricity not exceeding 25 volts so that the flow of current through the tube will raise the temperature of the tube to effect defrosting thereof, wherein the tube is electrically but not thermally insulated from the fins, so as to prevent short circuiting of the sinuous conducting path provided by the tube, by an insulating film between the juncture of the evaporator tube and each fin which film comprises a hard flexible film of a synthetic resin which is thermo-setting and free of plasticiser and of a thickness of the order of 0.003 of an inch and not exceeding 0.01 of an inch.

4. An evaporator comprising a sinuous tube and metal cooling fins extending across the lengths of said tube of heat dissipation, the sinuous tube being connected to a source of electricity having a voltage of the order of 0.5 to 5 volts so that the flow of current through the tube will raise the temperature of the tube to effect defrosting thereof, wherein the tube is electrically but not thermally insulated from the fins, so as to prevent short circuiting of the sinuous conducting path provided by the tube, by an insulating film between the juncture of the evaporator tube and each fin which film comprises a hard flexible film of a synthetic resin which is thermo-setting and free of plasticiser and of a thickness of the order of 0.003 of an inch and not exceeding 0.01 of an inch.

5. An evaporator comprising a sinuous tube and metal cooling fins extending across the lengths of said tube for heat dissipation, the sinuous tube being connected to a source of electricity not exceeding 25 volts so that the flow of current through the tube will raise the temperature of the tube to effect defrosting thereof, wherein the tube is electrically but not thermally insulated from the fins, so as to prevent short circuiting of the sinuous conducting path provided by the tube, by an insulating film between the juncture of the evaporator tube and each fin which film comprises a hard flexible film of a synthetic resin of a thickness of the order of 0.003 of an inch and not exceeding 0.01 of an inch, applied to the tube as at least two coatings.

6. An evaporator comprising a sinuous tube of a material having a higher specific resistance than copper and metal cooling fins extending across the lengths of said tube for heat dissipation, the sinuous tube being connected to a source of electricity not exceeding 25 volts so that the flow of current through the tube will raise the temperature of the tube to effect defrosting thereof, wherein the tube is electrically but not thermally insulated from the fins, so as to prevent short circuiting of the sinuous conducting path provided by the tube, by an insulating film between the juncture of the evaporator tube and each fin which film comprises a hard flexible film of a synthetic resin of a thickness of the order of 0.003 of an inch and not exceeding 0.01 of an inch.

7. The combination of an evaporator comprising a sinuous tube andn metal cooling fins extending across the lengths of said tube for heat dissipation, and a low voltage transformer having an output voltage not exceeding 25 volts and a secondary winding wound with twin insulating wire, the twin wires being electrically connected together at one end of said winding and said joined ends connected to the evaporator tube intermediate the ends of the latter, the other ends of said wires being connected respectively to the ends of the evaporator tube so that the flow of current through the tube will raise the temperature of the tube to effect defrosting thereof, the tube being electrically but not thermally insulated from the fins, so as to prevent short circuiting of the sinuous conducting path provided by the tube, by an insulating film between the juncture of the evaporator tube and each fin which film comprises a hard flexible film of a synthetic resin of a thickness of the order of 0.003 of an inch and not exceeding 0.01 of an inch.

8. An evaporator comprising a sinuous tube and metal cooling fins extending across the lengths of said tube for heat dissipation, the two ends of the evaporator tube being electrically connected together and also connected to one side of an electricity supply, the evaporator tube at a point intermediate its ends being connected to the other side of the supply, said supply not exceeding 25 volts, so that the flow of current through the tube will raise the temperature of the tube to effect defrosting thereof, the tube being electrically but not thermally insulated from the fins, so as to prevent short circuiting of the sinuous conducting path provided by the tube, by an insulating film between the juncture of the evaporator tube and each fin which film comprises a hard flexible film of a synthetic resin of a thickness of the order of 0.003 of an inch and not exceeding 0.01 of an inch.

9. The combination claimed in claim 7 wherein the connection to the evaporator tube intermediate its ends is made closer to one end than the other.

10. An evaporator as claimed in claim 8 wherein the connection to the evaporator tube intermediate its ends is made closer to one end than the other.

11. An evaporator comprising a sinuous tube and metal cooling fins extending across the lengths of said tube for heat dissipation, the sinuous tube having at least two lengths electrically connected in parallel and adapted to be connected to a source of electricity not exceeding 25 volts so that the flow of current through the tube will raise the temperature of the tube to effect defrosting thereof, wherein the tube is electrically but not thermally insulated from the fins, so as to prevent short circuiting of the sinuous conducting path provided by the tube, by an insulating film between the juncture of the evaporator tube and each fin which film comprises a hard flexible film of a synthetic resin of a thickness of the order of 0.003 of an inch and not exceeding 0.01 of an inch.

12. An evaporator comprising a sinuous tube and metal cooling fins extending across the lengths of said tube for heat dissipation, the sinuous tube being adapted to be connected to a source of electricity not exceeding 25 volts so that the flow of current through the tube will raise the temperature of the tube to effect defrosting thereof, wherein the tube is electrically but not thermally insulated from the fins, so as to prevent short circuiting of the sinuous conducting path provided by the tube, by an insulating film between the juncture of the evaporator tube and each fin which film comprises a hard flexible film of a synthetic resin of a thickness of the order of 0.003 of an inch and not exceeding 0.01 of an inch, and wherein the evaporator tube is made of thicker section at some parts than at others.

References Cited in the file of this patent

UNITED STATES PATENTS

| | | |
|---|---|---|
| 1,988,683 | Diehl | Jan. 22, 1935 |
| 2,066,935 | Hodnette | Jan. 5, 1937 |

FOREIGN PATENTS

| | | |
|---|---|---|
| 203,531 | Australia | Nov. 11, 1954 |

OTHER REFERENCES

Literature from the Ciba Company, Incorporated, of 627 Greenwich Street, New York 14, New York, entitled "Araldite—A new group of triple function resins of the ethyxyline class," dated March 13, 1952.